United States Patent
Shahana et al.

(10) Patent No.: US 11,371,603 B2
(45) Date of Patent: Jun. 28, 2022

(54) CONTROL DEVICE AND TRANSMISSION SYSTEM

(71) Applicant: Shimano Inc., Osaka (JP)

(72) Inventors: Satoshi Shahana, Osaka (JP);
Mitsuhiko Kawasaki, Osaka (JP)

(73) Assignee: Shimano Inc., Osaka (JP)

( * ) Notice: Subject to any disclaimer, the term of this patent is extended or adjusted under 35 U.S.C. 154(b) by 50 days.

(21) Appl. No.: 16/901,587

(22) Filed: Jun. 15, 2020

(65) Prior Publication Data

US 2021/0010588 A1  Jan. 14, 2021

(30) Foreign Application Priority Data

Jul. 8, 2019 (JP) .............................. JP2019-126979

(51) Int. Cl.
| | |
|---|---|
| *F16H 61/02* | (2006.01) |
| *F16H 59/14* | (2006.01) |
| *F16H 59/44* | (2006.01) |
| *F16H 59/42* | (2006.01) |
| *F16H 59/48* | (2006.01) |
| *F16H 59/66* | (2006.01) |
| *B62M 25/08* | (2006.01) |
| *B62J 45/20* | (2020.01) |
| *F16H 59/64* | (2006.01) |

(52) U.S. Cl.
CPC .......... *F16H 61/0213* (2013.01); *B62J 45/20* (2020.02); *B62M 25/08* (2013.01); *F16H 59/14* (2013.01); *F16H 59/42* (2013.01); *F16H 59/44* (2013.01); *F16H 59/48* (2013.01); *F16H 59/64* (2013.01); *F16H 59/66* (2013.01); *F16H 2059/147* (2013.01); *F16H 2059/663* (2013.01)

(58) Field of Classification Search
CPC .......... F16H 59/14; F16H 59/42; F16H 59/44; F16H 59/48; F16H 59/64; F16H 59/66; F16H 2059/663; F16H 2059/147; F16H 61/0213; B62J 45/20; B62M 25/08
See application file for complete search history.

(56) References Cited

U.S. PATENT DOCUMENTS

| | | | | |
|---|---|---|---|---|
| 6,047,230 | A * | 4/2000 | Spencer | ................. B62M 25/08 701/57 |
| 2003/0060325 | A1* | 3/2003 | Takeda | .................... B62M 25/08 477/34 |
| 2013/0054066 | A1* | 2/2013 | Watarai | ..................... B62M 6/45 701/22 |

(Continued)

FOREIGN PATENT DOCUMENTS

JP          2005-96537 A       4/2005

*Primary Examiner* — Edwin A Young
(74) *Attorney, Agent, or Firm* — Global IP Counselors, LLP

(57) ABSTRACT

A control device and a transmission system are provided that allow for comfortable traveling with a human-powered vehicle. The control device includes an electronic controller configured to control a transmission to shift a transmission ratio of a human-powered vehicle in accordance with a first shifting condition set based on a first reference value. The electronic controller is configured to shift the transmission ratio of the human-powered vehicle regardless of the first shifting condition upon determining a second shifting condition set based on travel information related to traveling of the human-powered vehicle is satisfied.

13 Claims, 6 Drawing Sheets

(56) References Cited

U.S. PATENT DOCUMENTS

| | | | |
|---|---|---|---|
| 2016/0031527 A1* | 2/2016 | Bortolozzo | B62M 9/123 |
| | | | 701/58 |
| 2016/0167738 A1* | 6/2016 | Fukao | F16H 61/684 |
| | | | 701/52 |
| 2016/0185421 A1* | 6/2016 | Komatsu | B62M 9/12 |
| | | | 701/2 |

* cited by examiner

CONTROL DEVICE AND TRANSMISSION SYSTEM

CROSS-REFERENCE TO RELATED APPLICATIONS

This application claims priority to Japanese Patent Application No. 2019-126979, filed on Jul. 8, 2019. The entire disclosure of Japanese Patent Application No. 2019-126979 is hereby incorporated herein by reference.

BACKGROUND

Technical Field

The present invention generally relates to a control device and a transmission system.

Background Information

A known shifting control device controls a transmission based on detection results of multiple travel states of a human-powered vehicle. Japanese Laid-Open Patent Publication No. 2005-96537 (Patent Document 1) discloses an example of a shifting control device known in the prior art.

SUMMARY

One object of the present disclosure is to provide a control device and a transmission system that allow for comfortable traveling with a human-powered vehicle.

A control device in accordance with a first aspect of the present disclosure comprises an electronic controller that is configured to control a transmission to shift a transmission ratio of a human-powered vehicle in accordance with a first shifting condition set based on a first reference value. The electronic controller is configured to shift the transmission ratio of the human-powered vehicle regardless of the first shifting condition upon determining a second shifting condition set based on travel information related to traveling of the human-powered vehicle is satisfied.

With the control device according to the first aspect, in a case where the second shifting condition is satisfied, the transmission ratio of the human-powered vehicle A is shifted regardless of the first shifting condition. The transmission performs shifting in a preferred manner. This allows for comfortable traveling with the human-powered vehicle.

In accordance with a second aspect of the present disclosure, the control device according to the first aspect is configured so that the first shifting condition includes a first threshold value and a second threshold value that is smaller than the first threshold value. The electronic controller is configured to perform second shifting that increases the transmission ratio of the human-powered vehicle upon determining the first reference value is greater than or equal to the first threshold value. The electronic controller is configured to perform first shifting that decreases the transmission ratio of the human-powered vehicle upon determining the first reference value is less than or equal to the second threshold value.

The control device according to the second aspect shifts the transmission ratio in a preferred manner. This allows for comfortable traveling with the human-powered vehicle.

In accordance with a third aspect of the present disclosure, the control device according to the first or second aspect is configured so that the first reference value includes at least one of a cadence, a torque acting on a crank of the human-powered vehicle, a power, and a vehicle speed of the human-powered vehicle.

The control device according to the third aspect appropriately shifts the transmission ratio of the human-powered vehicle.

In accordance with a fourth aspect of the present disclosure, the control device according to any one of the first to third aspects is configured so that the travel information related to traveling of the human-powered vehicle includes first travel information related to a traveling state of the human-powered vehicle. The first travel information includes at least one of a cadence, a torque acting on a crank of the human-powered vehicle, a power, a vehicle speed of the human-powered vehicle, an acceleration of the human-powered vehicle, and a deceleration of the human-powered vehicle.

The control device according to the fourth aspect appropriately shifts the transmission ratio of the human-powered vehicle.

In accordance with a fifth aspect of the present disclosure, the control device according to the fourth aspect is configured so that the first travel information includes the deceleration of the human-powered vehicle. The electronic controller is configured to determine that the second shifting condition is satisfied upon determining the deceleration is greater than or equal to a first predetermined value during a predetermined period.

The control device according to the fifth aspect performs a shifting action in a preferred manner during deceleration. This allows for comfortable traveling with the human-powered vehicle.

In accordance with a sixth aspect of the present disclosure, the control device according to the fifth aspect is configured so that the electronic controller is configured to perform a first shifting that decreases the transmission ratio of the human-powered vehicle upon determining the second shifting condition is satisfied.

The control device according to the sixth aspect decreases the transmission ratio during deceleration. This allows for comfortable traveling with the human-powered vehicle.

In accordance with a seventh aspect of the present disclosure, the control device according to the fifth or sixth aspect is configured so that the electronic controller is configured to determine a multiple number of times whether or not the deceleration is greater than or equal to the first predetermined value during the predetermined period. The electronic controller is configured to determine that the second shifting condition is not satisfied upon determining the deceleration is greater than or equal to the first predetermined value only one time during the predetermined period.

The control device according to the seventh aspect allows for comfortable traveling with the human-powered vehicle.

In accordance with an eighth aspect of the present disclosure, the control device according to any one of the fifth to seventh aspects is configured so that the first travel information further includes the vehicle speed of the human-powered vehicle. The electronic controller is configured to determine that the second shifting condition is not satisfied upon determining the vehicle speed is greater than or equal to a predetermined speed.

The control device according to the eighth aspect allows for comfortable traveling with the human-powered vehicle.

In accordance with a ninth aspect of the present disclosure, the control device according to any one of the fourth to eighth aspects is configured so that the first travel information includes the deceleration of the human-powered vehicle. The electronic controller is configured to restrict shifting of the transmission ratio of the human-powered vehicle upon determining the deceleration is greater than or equal to a second predetermined value that is greater than the first predetermined value.

The control device according to the ninth aspect does not perform shifting, for example, during a quick stopping. This allows for comfortable traveling with the human-powered vehicle.

In accordance with a tenth aspect of the present disclosure, the control device according to any one of the fourth to ninth aspects is configured so that the first travel information includes the torque acting on the crank of the human-powered vehicle. The electronic controller is configured to determine that the second shifting condition is satisfied and is configured to perform a first shifting that decreases the transmission ratio of the human-powered vehicle upon determining a value of the torque is greater than or equal to a predetermined value.

The control device according to the tenth aspect performs the first shifting in a preferred manner. This allows for comfortable traveling with the human-powered vehicle.

In accordance with an eleventh aspect of the present disclosure, the control device according to any one of the first to tenth aspects is configured so that the travel information includes second travel information related to a traveling environment of the human-powered vehicle. The second travel information includes at least one of road surface information related to a road surface state, air resistance information related to air resistance, weather information related to weather, and ambient temperature information related to ambient temperature.

The control device according to the eleventh aspect shifts the transmission ratio of the human-powered vehicle in a preferred manner.

In accordance with a twelfth aspect of the present disclosure, the control device according to the eleventh aspect is configured so that the road surface information includes information related to gradient of a road surface on which the human-powered vehicle travels.

The control device according to the twelfth aspect shifts the transmission ratio of the human-powered vehicle in a preferred manner.

In accordance with a thirteenth aspect of the present disclosure, the control device according to the twelfth aspect is configured so that the electronic controller is configured to determine that the second shifting condition is satisfied and is configured to perform a first shifting that decreases the transmission ratio of the human-powered vehicle upon determining the gradient is greater than or equal to a predetermined angle.

The control device according to the thirteenth aspect allows for comfortable traveling with the human-powered vehicle.

In accordance with a fourteenth aspect of the present disclosure, the control device according to any one of the first to thirteenth aspects is configured so that the electronic controller is configured to control the transmission based on the second shifting condition upon determining the first shifting condition and the second shifting condition are satisfied.

The control device according to the fourteenth aspect allows for comfortable traveling with the human-powered vehicle.

A transmission system in accordance with a fifteenth aspect of the present disclosure comprises the control device according to any one of the first to eighteenth aspects, and the transmission system further comprises the transmission described above.

With the transmission system according to the fifteenth aspect, upon determining the second shifting condition is satisfied, the transmission ratio of the human-powered vehicle A is shifted regardless of the first shifting condition. The transmission performs shifting in a preferred manner. This allows for conformable traveling with the human-powered vehicle.

The control device and the transmission system according to the present disclosure allow for comfortable traveling with the human-powered vehicle.

BRIEF DESCRIPTION OF THE DRAWINGS

Referring now to the attached drawings which form a part of this original disclosure.

DETAILED DESCRIPTION OF EMBODIMENTS OF THE DISCLOSURE

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
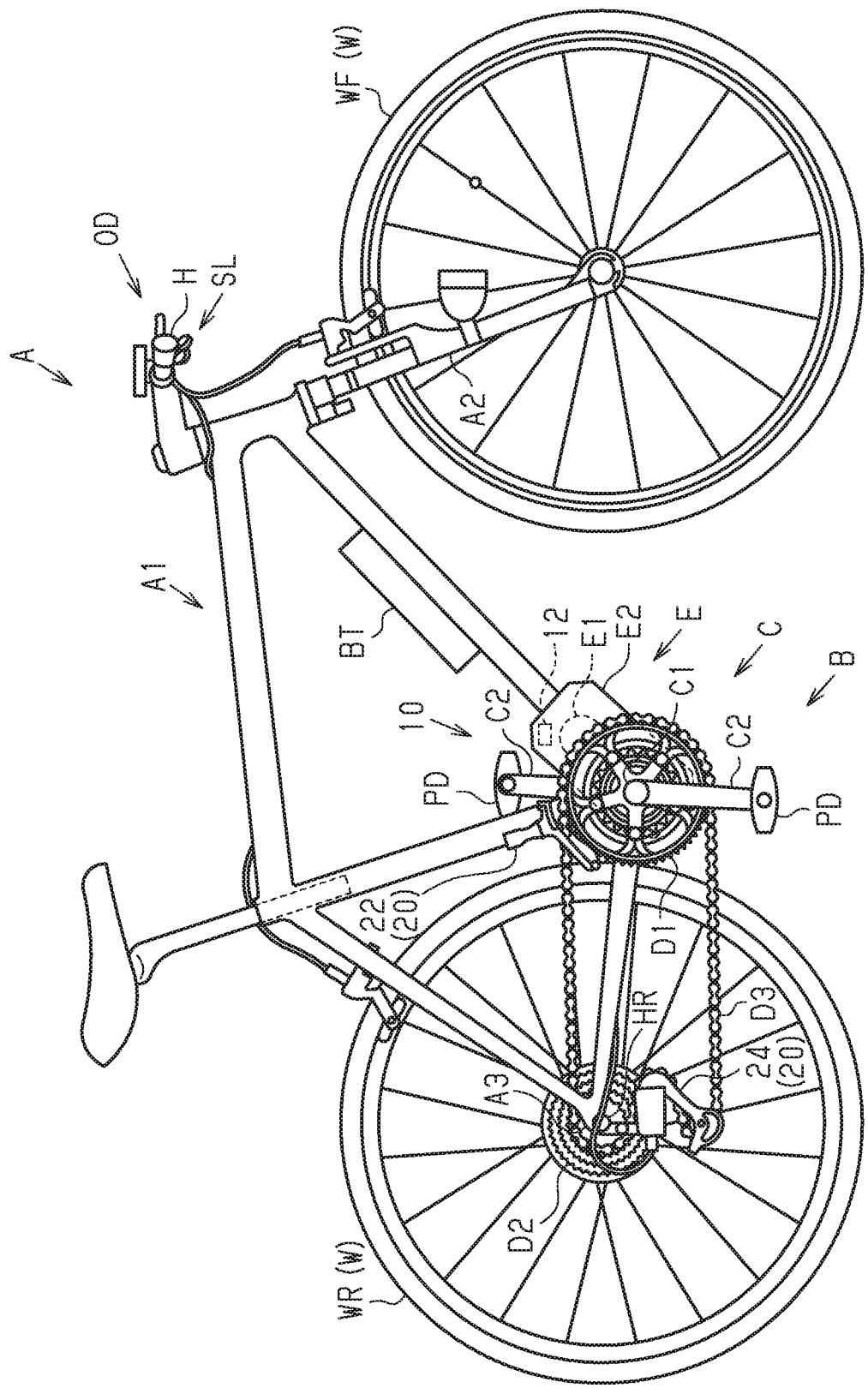
FIG. 1 is a side elevational view of a human-powered vehicle (e.g., a bicycle) including a transmission system in accordance with a first embodiment.

A human-powered vehicle A including a transmission system 10 will now be described with reference to FIG. 1. The term "human-powered vehicle" refers to a vehicle at least partially using human power as driving force for travelling and includes a vehicle electrically assisting human power. The term "human-powered vehicle" does not include vehicles using only driving force that is not human power. In particular, a vehicle using only an internal combustion engine as driving force is not included in the human-powered vehicle. The human-powered vehicle is generally assumed to be a small, light vehicle that does not require a license for driving on a public road. The illustrated human-powered vehicle A includes an electric assist unit E that assists human driving force with electrical energy. More specifically, the illustrated human-powered vehicle A is a trekking bike. The human-powered vehicle A further includes a frame A1, a front fork A2, a pair of wheels W, and a drivetrain B. The wheels W include a front wheel WF and a rear wheel WR.

The drivetrain B is, for example, a chain-drive type. The drivetrain B includes a crank C, a plurality of front sprockets D1, a plurality of rear sprockets D2, and a chain D3. The crank C includes a crank axle C1 rotatably supported by the frame A1 and a pair of crank arms C2 respectively provided on opposite ends of the crank axle C1. A pedal PD is rotatably coupled to the distal end of each of the crank arms C2. The drivetrain B can be selected from any type and can be a belt-drive type or a shaft-drive type.

The front sprockets D1 are provided on the crank C to rotate integrally with the crank axle C1. The rear sprockets D2 are provided on a hub HR of the rear wheel WR. The chain D3 runs around the front sprockets D1 and the rear sprockets D2. Human driving force applied to the pedals PD by the rider of the human-powered vehicle A is transmitted via the front sprockets D1, the chain D3, and the rear sprockets D2 to the rear wheel WR.

The electric assist unit E is actuated to assist in propulsion of the human-powered vehicle A. The electric assist unit E is actuated, for example, in accordance with human driving force applied to the pedals PD. The electric assist unit E includes a motor E1. The electric assist unit E is actuated by electric power supplied from a battery BT mounted on the human-powered vehicle A.

The transmission system 10 includes a control device 12 and a transmission 20. The control device 12 is accommodated, for example, in a housing E2 of the electric assist unit E. The control device 12 is actuated by electric power supplied from the battery BT.

The transmission 20 includes an external transmission device. In an example, the transmission 20 includes at least one of a front derailleur 22 and a rear derailleur 24. The front derailleur 22 is provided in the vicinity of the front sprockets D1. As the front derailleur 22 is driven, the front sprocket D1 on which the chain D3 runs is changed to change the transmission ratio of the human-powered vehicle A. The transmission ratio of the human-powered vehicle A is set based on the relationship between the number of teeth of the front sprocket D1 and the number of teeth of the rear sprocket D2. In an example, the transmission ratio of the human-powered vehicle A is defined by the ratio of rotational speed of the rear sprocket D2 to rotation speed of the front sprocket D1. More specifically, the transmission ratio of the human-powered vehicle A is defined by the ratio of the number of teeth of the front sprocket D1 to the number of teeth of the rear sprocket D2. The rear derailleur 24 is provided on a rear end A3 of the frame A1. As the rear derailleur 24 is driven, the rear sprocket D2 on which the chain D3 runs is changed to change the transmission ratio of the human-powered vehicle A. The front sprockets D1 and the rear sprockets D2 can be any component. The number of front sprockets D1 is, for example, one. In an example, the front sprocket D1 includes a front sprocket D1 having 34 teeth. In this case, the front derailleur 22 can be omitted. The number of rear sprockets D2 is, for example, eleven. In an example, the rear sprockets D2 include rear sprockets D2 having 46 teeth, 37 teeth, 32 teeth, 28 teeth, 24 teeth, 21 teeth, 19 teeth, 17 teeth, 15 teeth, 13 teeth, and 11 teeth. In another example, the number of front sprockets D1 is two. The front sprockets D1 include front sprockets D1 having 34 teeth and 24 teeth, respectively. The number of rear sprockets D2 is, for example, twelve. The rear sprockets D2 include rear sprockets D2 having 51 teeth, 45 teeth, 39 teeth, 33 teeth, 28 teeth, 24 teeth, 21 teeth, 18 teeth, 16 teeth, 14 teeth, 12 teeth, and 10 teeth. The transmission 20 can include an internal transmission device instead of an external transmission device. In this case, the internal transmission device is provided, for example, on the hub HR of the rear wheel WR. The transmission 20 can include a stepless transmission device instead of an external transmission device. In this case, the stepless transmission device is provided, for example, on the hub HR of the rear wheel WR. The transmission 20 shifts the transmission ratio of the human-powered vehicle A in accordance with an operating signal from a shift operating device SL.

Figure 2:
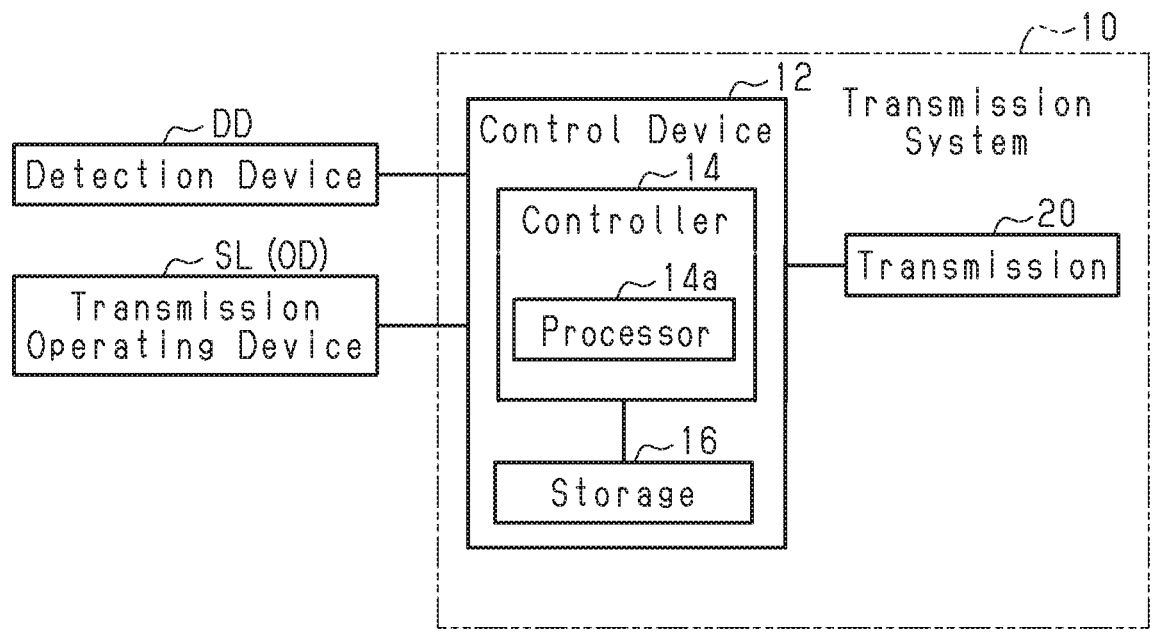
FIG. 2 is a block diagram showing the electrical connection relationship between the control device of the first embodiment and various components.

Specific configurations of the transmission system 10 will now be described with reference to FIG. 2. The control device 12 includes an electronic controller 14 that is configured to control a component mounted on the human-powered vehicle A. The component of the human-powered vehicle A includes at least the transmission 20. In an example, the electronic controller 14 controls the transmission 20 to shift the transmission ratio of the human-powered vehicle A in accordance with information related to the human-powered vehicle A. In an example, the electronic controller 14 controls the transmission 20 in accordance with a predetermined shifting condition including information related to the human-powered vehicle A. In an example, the predetermined shifting condition includes at least one of a first shifting condition and a second shifting condition. In an example, the first shifting condition is used to determine whether or not to shift the transmission ratio of the human-powered vehicle A. The second shifting condition is used to determine whether or not to facilitate shifting of the transmission ratio of the human-powered vehicle A. Facilitation of shifting of the transmission ratio includes shifting of the transmission ratio instead of or in addition to shifting of the transmission ratio determined with the first shifting condition and shifting of the speed stage determined with the first shifting condition.

The control device 12 includes the electronic controller 14 that is configured to control the transmission 20 to shift the transmission ratio of the human-powered vehicle A in accordance with the first shifting condition set based on a first reference value. The electronic controller 14 includes at least one of a central processing unit (CPU) and a micro processing unit (MPU) that includes at least one processor 14a that executes predetermined control programs. The electronic controller 14 can also control the transmission 20 in accordance with an operation performed on the shift operating device SL. The electronic controller 14 can further control various components mounted on the human-powered vehicle A in addition to the transmission 20 of the human-powered vehicle A. The term "electronic controller" as used herein refers to hardware that executes a software program, and does not include a human. The control device 12 further includes storage 16 that stores various types of information, control programs and control processes. The storage 16 includes any computer storage device or any non-transitory computer-readable medium with the sole exception of a transitory, propagating signal. For example, the storage 64 includes a nonvolatile memory and a volatile memory. A non-volatile memory includes, for example, at least one of a read-only memory (ROM), an erasable programmable read-only memory (EPROM), an electrically erasable programmable read-only memory (EEPROM), and a flash memory. A volatile memory includes, for example, a random access memory (RAM). The storage 16 stores, for example, various types of programs used for control and predetermined information.

The human-powered vehicle A includes an operating device OD that accepts external inputs. The operating device OD includes at least the shift operating device SL. The transmission 20 is configured to be mechanically or electrically driven, for example, in accordance with an operation performed on the shift operating device SL. In a case where the transmission 20 is electrically driven, the transmission 20 is actuated by electric power supplied from the battery BT or a dedicated power supply mounted on the transmission 20. The shift operating device SL is configured to shift the speed stage. The speed stage is set to correspond to the transmission ratio. In a case where the shift operating device SL is operated, the transmission 20 is actuated to shift the speed stage and the transmission ratio of the human-powered vehicle A. In an example, in a case where the shift operating device SL is operated, the transmission 20 is actuated to decrease the transmission ratio of the human-powered vehicle A. In another example, in a case where the shift operating device SL is operated, the transmission 20 is actuated to increase the transmission ratio of the human-powered vehicle A. The shift operating device SL is configured to perform wired or wireless communication with the electronic controller 14. In the description hereafter, shifting that decreases the transmission ratio of the human-powered vehicle A with the transmission 20 can be referred to as first shifting, and shifting that increases the transmission ratio of the human-powered vehicle A with the transmission 20 can be referred to as second shifting. The first shifting is synonymous with a downshift to a lower speed stage. The second shifting is synonymous with an upshift to a higher speed stage.

The human-powered vehicle A further includes a detection device DD configured to detect various types of information. The detection device DD detects, for example, the first reference value and travel information related to traveling of the human-powered vehicle A. The first reference value includes at least one of cadence, torque acting on the crank C of the human-powered vehicle A, power, and vehicle speed of the human-powered vehicle A. Cadence is synonymous with the number of revolutions per unit time of the crank C. Power is the product of cadence and torque. The travel information related to traveling of the human-powered vehicle A includes first travel information related to a traveling state of the human-powered vehicle A. The first travel information includes at least one of cadence, torque acting on the crank C of the human-powered vehicle A, power, vehicle speed of the human-powered vehicle A, acceleration of the human-powered vehicle A, and deceleration of the human-powered vehicle A. In an example, the detection device DD includes at least one of a sensor configured to detect the number of revolutions of the crank C to detect cadence, a sensor configured to detect torque acting on the crank C of the human-powered vehicle A, a sensor configured to detect power, a sensor configured to detect vehicle speed of the human-powered vehicle A, and a sensor configured to detect acceleration of the human-powered vehicle A and deceleration of the human-powered vehicle A. The acceleration of the human-powered vehicle A and the deceleration of the human-powered vehicle A include at least one of an amount of change in vehicle speed per unit time and an amount of change in kinetic energy, which is a square function of vehicle speed. The detection device DD can calculate the first travel information. The detection device DD further detects the transmission ratio of the human-powered vehicle A. The travel information includes second travel information related to a traveling environment of the human-powered vehicle A. The second travel information includes at least one of road surface information related to a road surface state, air resistance information related to air resistance, weather information related to weather, and ambient temperature information related to ambient temperature. The road surface information includes information related to gradient of the road surface on which the human-powered vehicle A travels. The detection device DD is configured to detect the second travel information. In an example, the detection device DD includes a sensor configured to detect at least one piece of the second travel information. In another example, the detection device DD includes a communicator configured to receive at least one piece of the second travel information from an external device. The electronic controller 14 obtains various types of information detected by the detection device DD through wired or wireless communication.

In a case where the first shifting condition is satisfied, the electronic controller 14 changes a target transmission ratio related to the transmission ratio of the human-powered vehicle A. The electronic controller 14 executes shifting control that controls the transmission 20 so that the transmission ratio of the human-powered vehicle A matches the changed target transmission ratio. In a case where the target transmission ratio is changed, the speed stage corresponding to the target transmission ratio before the change differs from the speed stage corresponding to the changed target transmission ratio by one stage or two or more stages. The first shifting condition includes a first threshold value TH1 and a second threshold value TH2 that is smaller than the first threshold value TH1. In a case where the first reference value is greater than or equal to the first threshold value TH1, the electronic controller 14 performs the second shifting that increases the transmission ratio of the human-powered vehicle A. In a case where the first reference value is less than or equal to the second threshold value TH2, the electronic controller 14 performs the first shifting that decreases the transmission ratio of the human-powered vehicle A.

Figure 3:
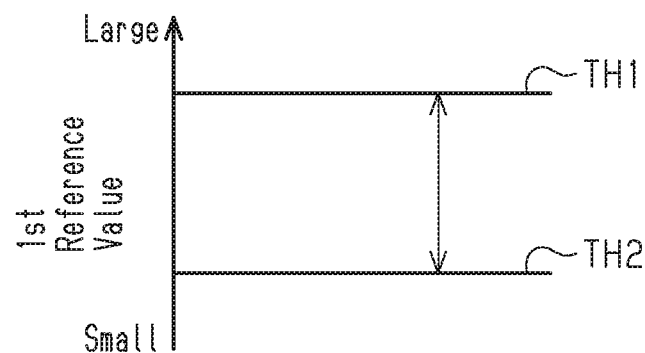
FIG. 3 is a map showing an example of a first shifting condition used in control of a transmission executed by the control device of the first embodiment.

FIG. 3 shows the relationship between the first reference value and the first threshold value TH1 and the relationship between the first reference value and the second threshold value TH2. The electronic controller 14 obtains the first reference value from the detection device DD mounted on the human-powered vehicle A. An example of the first reference value is cadence. The electronic controller 14 controls the transmission 20 to perform the second shifting in accordance with the relationship between the first reference value and the first threshold value TH1. The electronic controller 14 controls the transmission 20 to perform the first shifting in accordance with the relationship between the first reference value and the second threshold value TH2. The first threshold value TH1 and the second threshold value TH2 specify a predetermined range of the first reference value. The first threshold value TH1 specifies the upper limit of the predetermined range. The second threshold value TH2 specifies the lower limit of the predetermined range. The predetermined range is greater than the second threshold value TH2 and less than the first threshold value TH1. In an example, in a case where the first reference value is inside the predetermined range, the first shifting and the second shifting are not performed. In a case where the first reference value is greater than or equal to the first threshold value TH1, the electronic controller 14 controls the transmission 20 to perform the second shifting. In a case where the first reference value is less than or equal to the second threshold value TH2, the electronic controller 14 controls the transmission 20 to perform the first shifting. In a case where the first reference value is greater than or equal to the first threshold value TH1 and the present transmission ratio of the human-powered vehicle A is a maximum transmission ratio, the electronic controller 14 controls the transmission 20 to maintain the transmission ratio of the human-powered vehicle A. The maximum transmission ratio of the human-powered vehicle A is the maximum transmission ratio determined based on the relationship between the front sprockets D1 and the rear sprockets D2. In a case where the first reference value is less than or equal to the second threshold value TH2 and the present transmission ratio of the human-powered vehicle A is a minimum transmission ratio, the electronic controller 14 controls the transmission 20 to maintain the transmission ratio of the human-powered vehicle A. The minimum transmission ratio of the human-powered vehicle A is the minimum transmission ratio determined based on the relationship between the front sprockets D1 and the rear sprockets D2. The first threshold value TH1 and the second threshold value TH2 are set in any manner. In a first example, the first threshold value TH1 is 80 rpm. The second threshold value TH2 is 60 rpm. The predetermined range is 20 rpm. In a second example, the first threshold value TH1 is 85 rpm. The second threshold value TH2 is 55 rpm. The predetermined range is 30 rpm.

The electronic controller 14 shifts the transmission ratio of the human-powered vehicle A regardless of the first shifting condition in a case satisfying the second shifting condition set based on the travel information related to traveling of the human-powered vehicle A. Shifting the transmission ratio of the human-powered vehicle A regardless of the first shifting condition includes at least one of shifting the transmission ratio without referring to whether the first shifting condition is satisfied and shifting the transmission ratio in any one of a case where the first shifting condition is satisfied and a case where the first shifting condition is not satisfied. The electronic controller 14 executes a shifting facilitation control that controls the transmission 20 to shift the transmission ratio of the human-powered vehicle A. The electronic controller 14 executes the shifting facilitation control in accordance with travel information related to traveling of the human-powered vehicle A. In the shifting facilitation control, the transmission 20 is controlled so that the transmission ratio of the human-powered vehicle A shifts from the transmission ratio at a predetermined point of time, the transmission ratio at a predetermined point in time approaches the target transmission ratio, or the transmission ratio at a predetermined point in time matches the target transmission ratio. In an example, the predetermined point in time is a point in time at which it is determined that the second shifting condition is satisfied.

In the shifting control, the electronic controller 14 controls the transmission 20 to shift the transmission ratio of the human-powered vehicle A in accordance with first information related to the human-powered vehicle A. In the shifting facilitation control, the electronic controller 14 controls the transmission 20 to shift the transmission ratio of the human-powered vehicle A in accordance with second information related to the human-powered vehicle A. As the second information, the electronic controller 14 refers to information that differs in type from the first information.

The first information includes, for example, at least one of operating information related to an operation performed on the shift operating device SL and the first reference value. The second information includes, for example, the first travel information and second travel information related to traveling of the human-powered vehicle A. For example, the first reference value can have a characteristic that reflects the load on the rider in a relatively strong manner than, for example, the first travel information. For example, the first travel information can have a characteristic that reflects behavior of the human-powered vehicle A that is not intended by the rider in a relatively strong manner than, for example, the first reference value.

In the shifting control, the electronic controller 14 controls the transmission 20 in accordance with at least one of the operating information and the first reference value. The operating information includes designating information that designates a speed stage. The designating information includes information related to the number of shifted speed stages (hereafter referred to as "shift stage number") and the direction in which the speed stage is shifted (hereafter referred to as "shift direction"). The shift stage number is either one or two or more stages. The shift direction is upward or downward. The shift stage number and the shift direction determine the target speed stage.

The shifting control based on the operating information will now be described. The electronic controller 14 obtains the operating information from the shift operating device SL. In a case where the actual speed stage differs from the target speed stage determined by the operating information, the electronic controller 14 controls the transmission 20 so that the actual speed stage matches the target speed stage. In a case where the actual speed stage matches the target speed stage, the electronic controller 14 controls the transmission 20 to maintain the speed stage.

The shifting control executed based on the first reference value instead of or in addition to the operating information will now be described. The electronic controller 14 obtains the first reference value from the detection device DD. The electronic controller 14 is configured to determine whether or not the first shifting condition is satisfied based on the first reference value. In a case where the first shifting condition is satisfied, the electronic controller 14 controls the transmission 20 based on a shifting execution condition. The shifting execution condition includes multiple shifting execution conditions. In an example, the shifting execution conditions include first to fourth shifting execution conditions. The first shifting execution condition is for determining the target speed stage so that the shift stage number is one stage and the shift direction is upward. The second shifting execution condition is for determining the target speed stage so that the shift stage number is one stage and the shift direction is downward. The third shifting execution condition is for determining the target speed stage so that the shift stage number is two or more stages and the shift direction is upward. The fourth shifting execution condition is for determining the target speed stage so that the shift stage number is two or more stages and the shift direction is downward. In an example, the first shifting execution condition is satisfied in a case where the first reference value is greater than or equal to the first threshold value. The second shifting execution condition is satisfied in a case where the first reference value is less than or equal to the second threshold value. The third shifting execution condition is satisfied in a case where the first reference value is greater than or equal to the first threshold value and the operating information is obtained from the shift operating device SL. The fourth shifting execution condition is satisfied in a case where the first reference value is less than or equal to the second threshold value and the operating information is obtained from the shift operating device SL. The electronic controller 14 performs the first shifting in accordance with the second shifting execution condition and the fourth shifting execution condition. The electronic controller 14 performs the second shifting in accordance with the first shifting execution condition and the third shifting execution condition. The electronic controller 14 does not set the shifting execution conditions in a case where the first shifting condition is not satisfied.

In a case where one of the shifting execution conditions is satisfied, the electronic controller 14 sets the target speed stage that is determined from the shifting execution condition as a temporary target speed stage. The electronic controller 14 sets a final target speed stage based on the relationship between the temporary target speed stage set by the shifting control and a shifting facilitation request set by the shifting facilitation control. In a case where the shifting facilitation request is not set, the electronic controller 14 sets the temporary target speed stage as the final target speed stage. In a case where the actual speed stage differs from the final target speed stage, the electronic controller 14 controls the transmission 20 so that the actual speed stage matches the final target speed stage. In a case where the actual speed stage matches the final target speed stage, the electronic controller 14 controls the transmission 20 to maintain the actual speed stage.

The shifting facilitation control based on the travel information will now be described. The electronic controller 14 refers to at least one of the first travel information and the second travel information as the travel information. In an example, the first travel information includes deceleration of the human-powered vehicle A. In an example, the deceleration of the human-powered vehicle A is an amount of change in vehicle speed per unit time. In a case where the deceleration is greater than or equal to a first predetermined value during a predetermined period, the electronic controller 14 is configured to determine that the second shifting condition is satisfied. In a case where the second shifting condition is satisfied, the electronic controller 14 performs the first shifting that decreases the transmission ratio of the human-powered vehicle A. The predetermined period is set in any manner. In a first example, the rotational angle of the crank C is greater than a predetermined rotational angle. In a second example, the travel distance of the human-powered vehicle A is greater than a predetermined travel distance. In an example, the first predetermined value increases as an initial speed increases. In an example, in a case where the initial speed is 15 km/h, the first predetermined value is 1.0 m/s$^2$.

The electronic controller 14 is configured to determine a multiple number of times whether or not the deceleration is greater than or equal to the first predetermined value during the predetermined period. In a case where the electronic controller 14 determines that the deceleration is greater than or equal to the first predetermined value only one time during the predetermined period, the electronic controller 14 determines that the second shifting condition is not satisfied. In an example, the multiple number of times is two in the predetermined period for the electronic controller 14 to determine that the second shifting condition is satisfied. In another example, the multiple number of times is three or more in the predetermined period for the electronic controller 14 to determine that the second shifting condition is satisfied. In a case where the deceleration is greater than or equal to a second predetermined value that is greater than the first predetermined value, the electronic controller 14 is configured to restrict shifting of the transmission ratio of the human-powered vehicle A. In an example, the second predetermined value increases as an initial speed increases. In an example, the second predetermined value is greater than or equal to the first predetermined value times 1.5. In an example, in a case where the initial speed is 15 km/h, the second predetermined value is 3.0 m/s$^2$. In an example, in a case where the deceleration is greater than or equal to the second predetermined value, the electronic controller 14 is configured to determine that the second shifting condition is not satisfied. In another example, even in a case where the first shifting condition is satisfied, the electronic controller 14 is configured to control the transmission 20 to restrict shifting of the transmission ratio.

In a case where the second shifting condition is satisfied, the electronic controller 14 is configured to control the transmission 20 based on an execution facilitation condition. The execution facilitation condition includes multiple execution facilitation conditions. In an example, the execution facilitation conditions include first to third execution facilitation conditions. The first execution facilitation condition sets a shifting facilitation request that designates the temporary target speed stage as the final target speed stage. The second execution facilitation condition sets a shifting facilitation request that designates the final target speed stage so that the absolute value of the difference between the final target speed stage and the present speed stage is less than the difference between the temporary target speed stage and the present speed stage. The temporary speed stage is less than the present speed stage. The third execution facilitation condition sets a shifting facilitation request that clears the temporary target speed stage and designates another temporary target speed stage as the final target speed stage. The third execution facilitation condition includes a case in which the shift direction of the speed stage differs between the temporary target speed stage and another temporary target speed stage.

In a case where the second shifting condition is satisfied, the electronic controller 14 sets a shifting facilitation request corresponding to at least one of the first to third execution facilitation conditions. In a case where the first shifting condition is satisfied in the shifting control, the electronic controller 14 is configured to set at least one shifting facilitation request of the first to third execution facilitation conditions. In a case where the first shifting condition is not satisfied in the shifting control, the electronic controller 14 is configured to set a shifting facilitation request corresponding to at least one of the first to third execution facilitation conditions.

In a case where the first shifting condition and the second shifting condition are satisfied, the electronic controller 14 is configured to control the transmission 20 based on the second shifting condition. In a case where the first shifting condition is satisfied and a shifting facilitation request is set, the electronic controller 14 is configured to set the final target speed stage in accordance with the shifting facilitation request. In a case where the first shifting condition is satisfied, the temporary target speed stage is cleared without being set as the final target speed stage.

Figure 4:
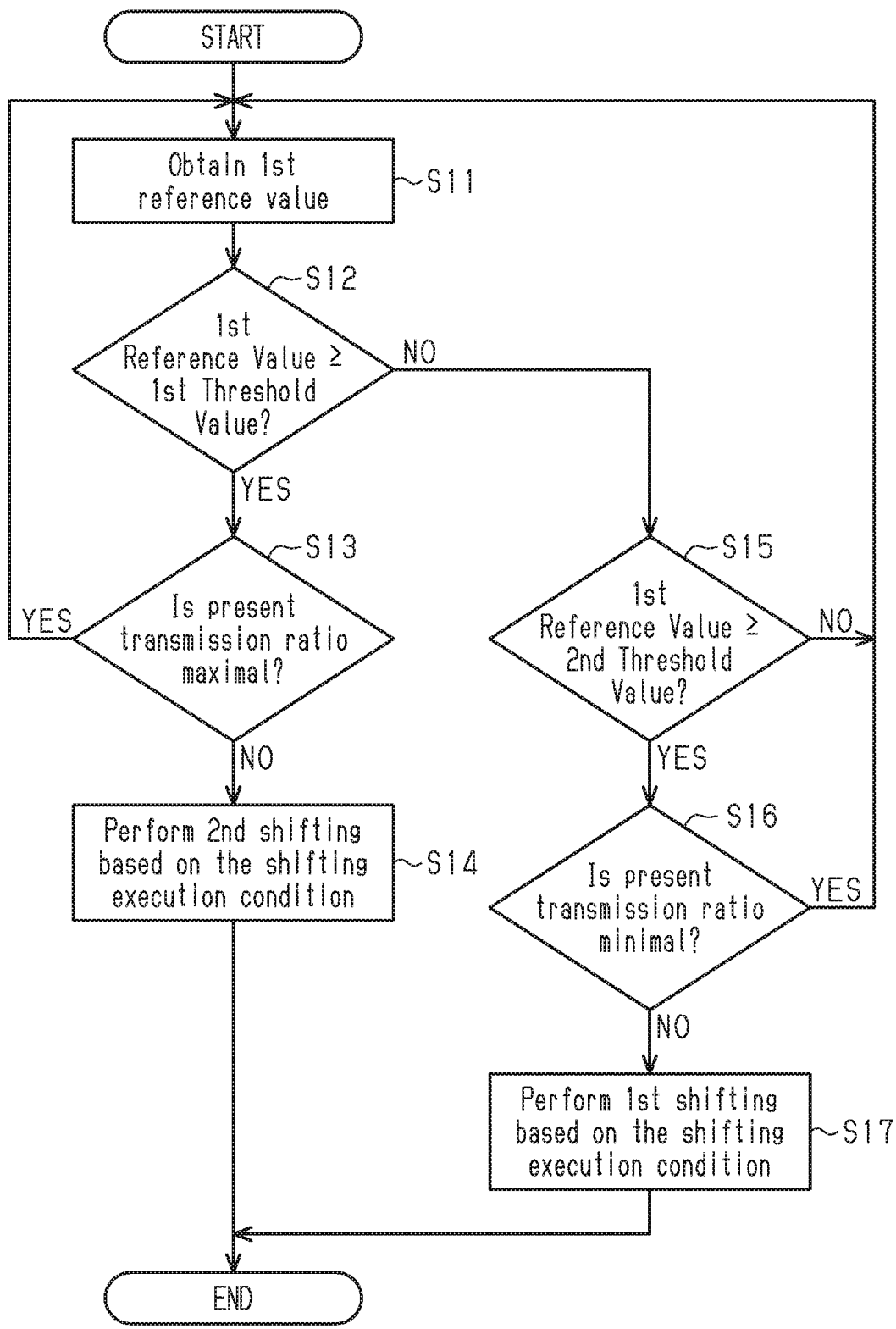
FIG. 4 is a flowchart showing an example of a shifting control executed by the control device of the first embodiment.

The shifting control executed by the control device 12 will now be described with reference to FIG. 4. In the shifting control, the electronic controller 14 determines whether or not the first shifting condition is satisfied and performs at least one of the first shifting and the second shifting based on the first reference value.

The electronic controller 14 is configured to perform the shifting control through, for example, the process described below. In step S11, the electronic controller 14 obtains the first reference value. More specifically, the electronic controller 14 obtains cadence, that is, the first reference value, from the detection device DD.

In step S12, the electronic controller 14 is configured to determine whether or not the first reference value is greater than or equal to the first threshold value TH1. In a case where the electronic controller 14 is configured to determine that the first reference value is greater than or equal to the first threshold value TH1, the electronic controller 14 proceeds to step S13. In a case where the electronic controller 14 determines that the first reference value is not greater than or equal to the first threshold value TH1, the electronic controller 14 proceeds to step S15.

In step S13, the electronic controller 14 determines whether the present transmission ratio of the human-powered vehicle A is the maximum transmission ratio. In a case where the electronic controller 14 determines that the present transmission ratio of the human-powered vehicle A is the maximum transmission ratio, the electronic controller 14 proceeds to step S11. In a case where the electronic controller 14 determines that the present transmission ratio of the human-powered vehicle A is not the maximum transmission ratio, the electronic controller 14 proceeds to step S14.

In step S14, the electronic controller 14 performs the second shifting based on the shifting execution condition to increase the transmission ratio of the human-powered vehicle A. Upon completion of step S14, the electronic controller 14 ends the control.

In step S15, the electronic controller 14 determines whether or not the first reference value is less than or equal to the second threshold value TH2. In a case where the electronic controller 14 determines that the first reference value is less than or equal to the second threshold value TH2, the electronic controller 14 proceeds to step S16. In a case where the electronic controller 14 determines that the first reference value is not less than or equal to the second threshold value TH2, the electronic controller 14 proceeds to step S11.

In step S16, the electronic controller 14 determines whether or not the present transmission ratio of the human-powered vehicle A is the minimum transmission ratio. In a case where the electronic controller 14 determines that the present transmission ratio of the human-powered vehicle A is the minimum transmission ratio, the electronic controller 14 proceeds to step S11. In a case where the electronic controller 14 determines that the present transmission ratio of the human-powered vehicle A is not the minimum transmission ratio, the electronic controller 14 proceeds to step S17.

In step S17, the electronic controller 14 performs the first shifting based on the shifting execution condition to decrease the transmission ratio of the human-powered vehicle A. Upon completion of step S17, the electronic controller 14 ends the control. The electronic controller 14 repetitively performs a first automatic shifting control including the process from steps S11 to S17 while, for example, the human-powered vehicle A is traveling.

Figure 5:
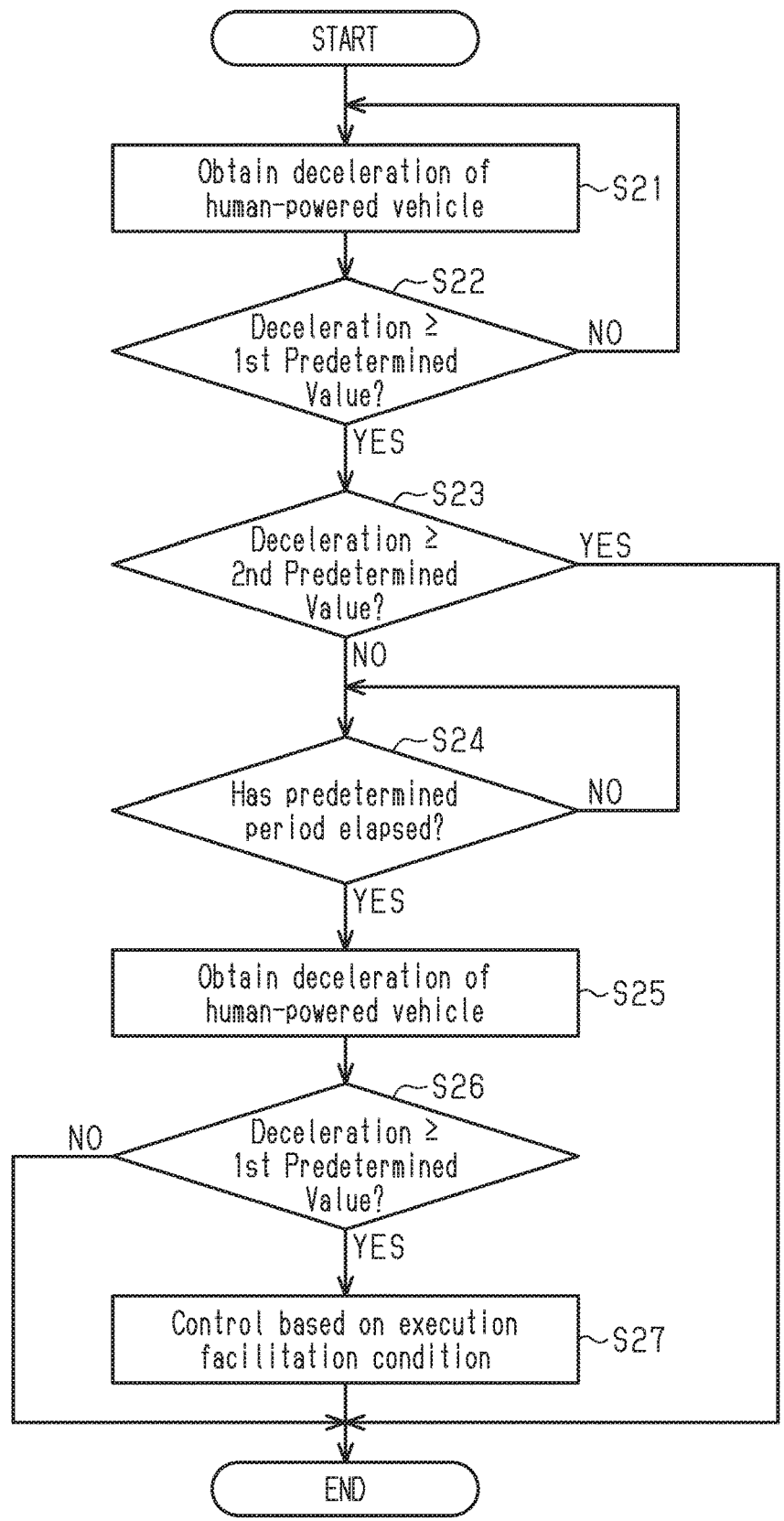
FIG. 5 is a flowchart showing an example of a first shifting facilitation control executed by the control device of the first embodiment.

First shifting facilitation control executed by the control device 12 based on the second shifting condition will now be described with reference to FIG. 5. In the first shifting facilitation control, the electronic controller 14 executes shifting of the transmission ratio based on the first travel information. The first travel information includes deceleration of the human-powered vehicle A. The electronic controller 14 executes the first shifting facilitation control in parallel with the shifting control.

The electronic controller 14 executes the first shifting facilitation control through, for example, the process described below. In step S21, the electronic controller 14 obtains deceleration of the human-powered vehicle A from the detection device DD. In step S22, the electronic controller 14 determines whether or not the deceleration is greater than or equal to the first predetermined value. In a case where the electronic controller 14 determines that the deceleration is greater than or equal to the first predetermined value, the electronic controller 14 proceeds to step S23. In a case where the electronic controller 14 determines that the deceleration is not greater than or equal to the first predetermined value, the electronic controller 14 proceeds to step S21.

In step S23, the electronic controller 14 determines whether or not the deceleration is greater than or equal to the second predetermined value. In a case where the electronic controller 14 determines that the deceleration is greater than or equal to the second predetermined value, the electronic controller 14 ends the control. In a case where the electronic controller 14 determines that the deceleration is not greater than or equal to the second predetermined value, the electronic controller 14 proceeds to step S24.

In step S24, the electronic controller 14 determines whether or not a predetermined period has elapsed. In a case where the electronic controller 14 determines that the predetermined period has elapsed, the electronic controller 14 proceeds to step S25. In a case where the electronic controller 14 determines that the predetermined period has not elapsed, the electronic controller 14 proceeds to step S24.

In step S25, the electronic controller 14 obtains deceleration of the human-powered vehicle A from the detection device DD. In step S26, the electronic controller 14 determines whether or not the deceleration is greater than or equal to the first predetermined value. In a case where the electronic controller 14 determines that the deceleration is greater than or equal to the first predetermined value, the electronic controller 14 proceeds to step S27. In a case where the electronic controller 14 determines that the deceleration is not greater than or equal to the first predetermined value, the electronic controller 14 ends the control.

In step S27, the electronic controller 14 controls the transmission 20 based on the execution facilitation condition. The electronic controller 14 repetitively executes the first shifting facilitation control including the process from steps S21 to S27 while, for example, the human-powered vehicle A is traveling.

Second Embodiment

Figure 6:
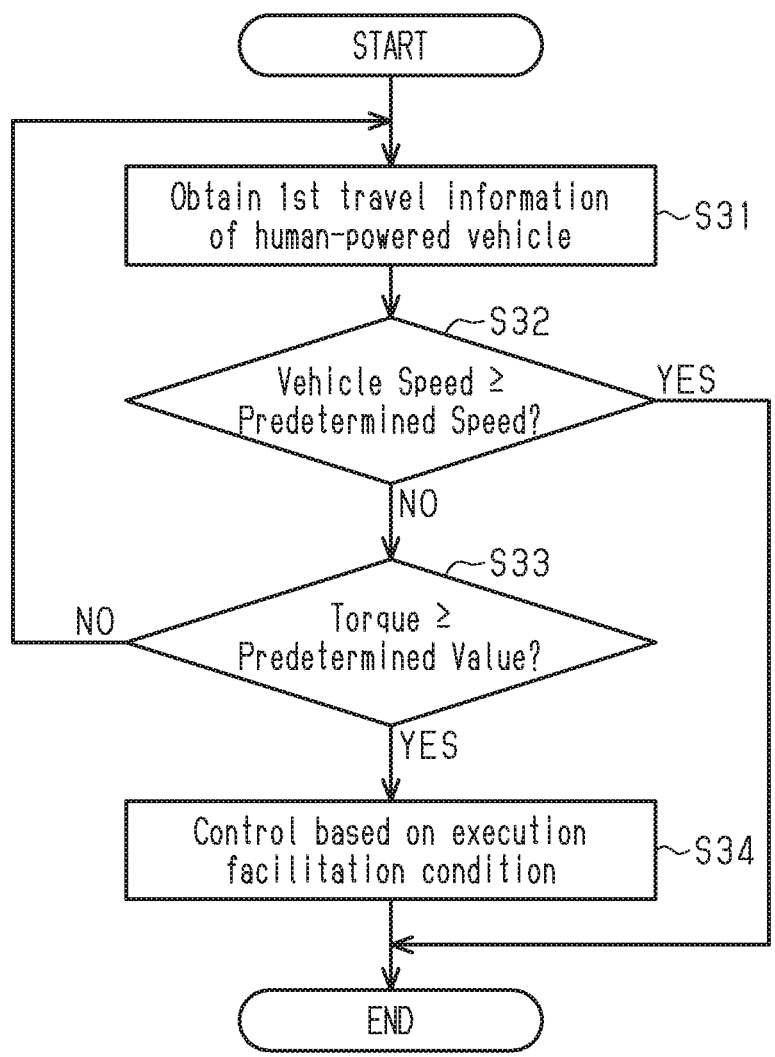
FIG. 6 is a flowchart showing an example of a second shifting facilitation control executed by a second embodiment of a control device.

A transmission system 10 in accordance with a second embodiment will now be described with reference to FIG. 6. In the transmission system 10 of the second embodiment, the electronic controller 14 executes the shifting facilitation control with reference to vehicle speed of the human-powered vehicle A and torque as the travel information. The shifting facilitation control of the second embodiment can be referred to as the second shifting facilitation control. In the description hereafter, same reference characters are given to those components that are the same as the corresponding components of the first embodiment. Such components will not be described in detail.

The electronic controller 14 executes the second shifting facilitation control instead of or in addition to the first shifting facilitation control. In the second shifting facilitation control, the electronic controller 14 executes shifting of the transmission ratio based on the first travel information. The first travel information includes torque acting on the crank C of the human-powered vehicle A. The first travel information further includes vehicle speed of the human-powered vehicle A. In a case where the vehicle speed is greater than or equal to a predetermined speed, the electronic controller 14 determines that the second shifting condition is not satisfied. In an example, the predetermined speed is 25 km/h. In a case where a value of the torque is greater than or equal to a predetermined value, the electronic controller 14 determines that the second shifting condition is satisfied and performs the first shifting that decreases the transmission ratio of the human-powered vehicle A. In an example, the predetermined value is 5 Nm.

The electronic controller 14 executes the second shifting facilitation control through, for example, the process described below. In step S31, the electronic controller 14 obtains the first travel information. More specifically, vehicle speed of the human-powered vehicle A and torque are detected.

In step S32, the electronic controller 14 determines whether or not the vehicle speed is greater than or equal to the predetermined speed. In a case where the electronic controller 14 determines that the vehicle speed is greater than or equal to the predetermined speed, the electronic controller 14 ends the control. In a case where the electronic controller 14 determines that the vehicle speed is not greater than or equal to the predetermined speed, the electronic controller 14 proceeds to step S33.

In step S33, the electronic controller 14 determines whether or not the torque is greater than or equal to the predetermined value. In a case where the electronic controller 14 determines that the torque is greater than or equal to the predetermined value, the electronic controller 14 proceeds to step S34. In a case where the electronic controller 14 determines that the torque is not greater than or equal to the predetermined value, the electronic controller 14 proceeds to step S31.

In step S34, the electronic controller 14 controls the transmission 20 based on the execution facilitation condition. The electronic controller 14 repetitively executes the second shifting facilitation control including the process from steps S31 to S34 while, for example, the human-powered vehicle A is traveling.

Third Embodiment

Figure 7:
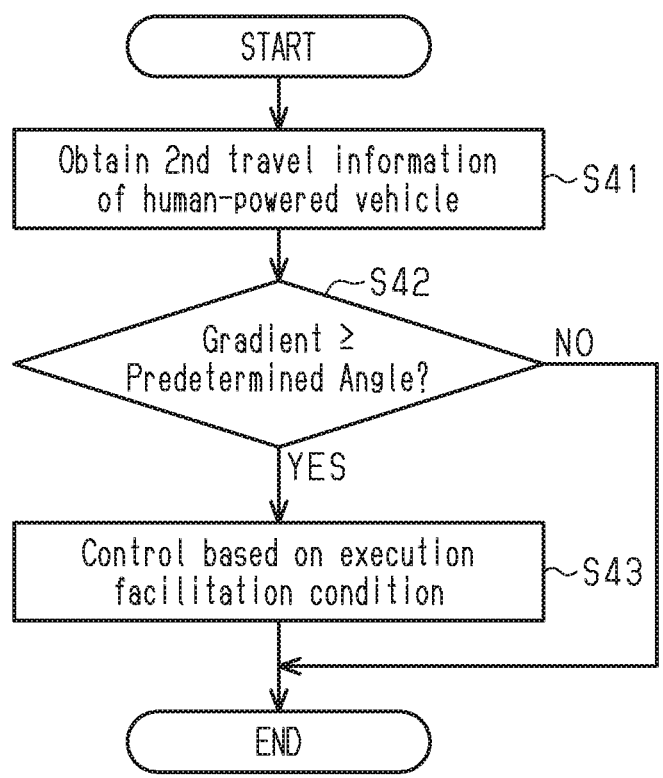
FIG. 7 is a flowchart showing an example of a third shifting facilitation control executed by a third embodiment of a control device.

A transmission system 10 in accordance with a third embodiment will now be described with reference to FIG. 7. In the transmission system 10 of the third embodiment, the electronic controller 14 executes the shifting facilitation control with reference to the second travel information as the travel information. The shifting facilitation control of the third embodiment can be referred to as the third shifting facilitation control. In the description hereafter, same reference characters are given to those components that are the same as the corresponding components of the first embodiment. Such components will not be described in detail.

The electronic controller 14 executes the third shifting facilitation control instead of or in addition to the first shifting facilitation control and the second shifting facilitation control. In the third shifting facilitation control, the electronic controller 14 executes shifting of the transmission ratio based on the second travel information. The second travel information includes information related to gradient of the road surface on which the human-powered vehicle A travels. In a case where the gradient is greater than or equal to a predetermined angle, the electronic controller 14 determines that the second shifting condition is satisfied and performs the first shifting that decreases the transmission ratio of the human-powered vehicle A. In an example, the predetermined angle is an angle corresponding to a grade of 15 percent.

The electronic controller 14 executes the third shifting facilitation control through, for example, the process described below. In step S41, the electronic controller 14 obtains the second travel information of the human-powered vehicle A. More specifically, gradient of the road surface on which the human-powered vehicle A travels is obtained. In step S42, the electronic controller 14 determines whether or not the gradient is greater than or equal to the predetermined angle. In a case where the electronic controller 14 determines that the gradient is greater than or equal to the predetermined angle, the electronic controller 14 proceeds to step S43. In a case where the electronic controller 14 determines that the gradient is not greater than or equal to the predetermined angle, the electronic controller 14 ends the control.

In step S43, the electronic controller 14 controls the transmission 20 based on the execution facilitation condition. The electronic controller 14 repetitively executes the third shifting facilitation control including the process from steps S41 to S43 while, for example, the human-powered vehicle A is traveling.

MODIFICATIONS

The description related with the above embodiments exemplifies, without any intention to limit, applicable forms of a control device and a transmission system according to the present disclosure. The control device and transmission system according to the present disclosure is applicable to, for example, modifications of the above embodiments that are described below and combinations of at least two of the modifications that do not contradict each other. In the modifications described hereinafter, same reference characters are given to those components that are the same as the corresponding components of the above embodiments. Such components will not be described in detail.

A first control mode that executes at least one of the first shifting facilitation control and the second shifting facilitation control and a second control mode that does not execute the first shifting facilitation control and the second shifting facilitation control can be provided. The operating device OD can be configured to switch between the first control mode and the second control mode. Information related to the first control mode and the second control mode is stored in, for example, the storage 16.

The electronic controller 14 can be configured not to execute the first shifting facilitation control and the second shifting facilitation control in a case where the vehicle speed is less than or equal to the predetermined vehicle speed. An example of the predetermined vehicle speed is 10 km/h.

The electronic controller 14 can use an estimated cadence calculated from the relationship between the vehicle speed and the present transmission ratio of the human-powered vehicle A as the first reference value. The electronic controller 14 can compare a value of cadence detected by a sensor configured to detect cadence with a value of the estimated cadence and use the greater one of the values as the first reference value.

The electronic controller 14 can be configured to execute the shifting facilitation control in a case where kinetic energy of the human-powered vehicle A is changed by the first predetermined value or more as the first travel information. In this case, the deceleration of the human-powered vehicle A is a decreased amount of kinetic energy of the human-powered vehicle A. Kinetic energy of the human-powered vehicle A is calculated by the vehicle speed and the mass of the human-powered vehicle A. The mass of the human-powered vehicle A is stored in advance in the storage 16. In an example, in a case where kinetic energy is decreased by the first predetermined value or more during the predetermined period, the electronic controller 14 controls the transmission 20 based on the execution facilitation condition. In an example, kinetic energy of the human-powered vehicle A is a reference value expressed in a square function of vehicle speed of the human-powered vehicle A. In a case where the reference value expressed in a square function of vehicle speed is decreased by the first predetermined value or greater during the predetermined period, the electronic controller 14 controls the transmission 20 based on the execution facilitation condition.

The detection device DD can be configured to detect rider information related to the rider of the human-powered vehicle A. The rider information includes at least one of heart rate, myopotential, perspiration amount, and body temperature of the rider.

The human-powered vehicle A can be of any type. The human-powered vehicle A can be at least one of a road bike, a mountain bike, a cross bike, a city cycle, a cargo bike, a recumbent bike, and a kick scooter.

In this specification, the phrase "at least one of" as used in this disclosure means "one or more" of a desired choice. As one example, the phrase "at least one of" as used in this disclosure means "only one choice" or "both of two choices" in a case where the number of choices is two. In another example, in this specification, the phrase "at least one of" as used in this disclosure means "only one single choice" or "any combination of equal to or more than two choices" if the number of its choices is equal to or more than three.

What is claimed is:

1. A control device comprising:
an electronic controller configured to control a transmission to shift a transmission ratio of a human-powered vehicle in accordance with a first shifting condition set based on a first reference value, the first reference value including at least one of a cadence of the human-powered vehicle, a torque acting on a crank of the human-powered vehicle, a power imparted to the human-powered vehicle by a rider, and a vehicle speed of the human-powered vehicle,
the electronic controller being configured to shift the transmission ratio of the human-powered vehicle regardless of the first shifting condition upon determining that a second shifting condition set based on travel information related to traveling of the human-powered vehicle is satisfied, and
the electronic controller being further configured to control the transmission based on the second shifting condition upon determining the first shifting condition and the second shifting condition are satisfied.

2. The control device according to claim 1, wherein
the travel information related to traveling of the human-powered vehicle includes first travel information related to a traveling state of the human-powered vehicle, and
the first travel information includes at least one of the cadence, the torque, the power, the vehicle speed, an acceleration of the human-powered vehicle, and a deceleration of the human-powered vehicle.

3. The control device according to claim 2, wherein
the first travel information includes the torque acting on the crank of the human-powered vehicle, and
the electronic controller is configured to determine that the second shifting condition is satisfied and is configured to perform a first shifting that decreases the transmission ratio of the human-powered vehicle upon determining a value of the torque is greater than or equal to a predetermined value.

4. The control device according to claim 1, wherein
the travel information includes second travel information related to a traveling environment of the human-powered vehicle, and
the second travel information includes at least one of road surface information related to a road surface state, air resistance information related to air resistance, weather information related to weather, and ambient temperature information related to ambient temperature.

5. The control device according to claim 4, wherein
the road surface information includes information related to a gradient of a road surface on which the human-powered vehicle travels.

6. The control device according to claim 5, wherein
the electronic controller is configured to determine that the second shifting condition is satisfied and is configured to perform a first shifting that decreases the transmission ratio of the human-powered vehicle upon determining the gradient is greater than or equal to a predetermined angle.

7. A transmission system comprising the control device according to claim 1, and the transmission system further comprising:
the transmission.

8. A control device comprising:
an electronic controller configured to control a transmission to shift a transmission ratio of a human-powered vehicle in accordance with a first shifting condition set based on a first reference value, the first shifting condition including a first threshold value and a second threshold value that is smaller than the first threshold value,
the electronic controller being configured to shift the transmission ratio of the human-powered vehicle regardless of the first shifting condition upon determining a second shifting condition set based on travel information related to traveling of the human-powered vehicle being satisfied,
the electronic controller being configured to perform a second shifting that increases the transmission ratio of the human-powered vehicle upon determining the first reference value is greater than or equal to the first threshold value, and
the electronic controller being configured to perform a first shifting that decreases the transmission ratio of the human-powered vehicle upon determining the first reference value is less than or equal to the second threshold value.

9. A control device comprising:
an electronic controller configured to control a transmission to shift a transmission ratio of a human-powered vehicle in accordance with a first shifting condition set based on a first reference value,
the electronic controller being configured to shift the transmission ratio of the human-powered vehicle regardless of the first shifting condition upon determining a second shifting condition set based on travel information related to traveling of the human-powered vehicle being satisfied, the travel information related to traveling of the human-powered vehicle including first travel information related to a traveling state of the human-powered vehicle, the first travel information including a deceleration of the human-powered vehicle, and the electronic controller is configured to determine that the second shifting condition is satisfied upon determining the deceleration is greater than or equal to a first predetermined value during a predetermined period.

10. The control device according to claim 9, wherein the electronic controller is configured to perform a first shifting that decreases the transmission ratio of the human-powered vehicle upon determining the second shifting condition is satisfied.

11. The control device according to claim 9, wherein the electronic controller is configured to determine a multiple number of times whether or not the deceleration is greater than or equal to the first predetermined value during the predetermined period, and the electronic controller is configured to determine that the second shifting condition is not satisfied upon determining the deceleration is greater than or equal to the first predetermined value only one time during the predetermined period.

12. The control device according to claim 9, wherein the first travel information further includes a vehicle speed of the human-powered vehicle, and the electronic controller is configured to determine that the second shifting condition is not satisfied upon determining the vehicle speed is greater than or equal to a predetermined speed.

13. The control device according to claim 9, wherein the first travel information includes the deceleration of the human-powered vehicle, and the electronic controller is configured to restrict the shifting of the transmission ratio of the human-powered vehicle upon determining the deceleration is greater than or equal to a second predetermined value that is greater than the first predetermined value.

\* \* \* \* \*